(12) United States Patent
Allie et al.

(10) Patent No.: US 10,880,466 B2
(45) Date of Patent: Dec. 29, 2020

(54) METHOD OF REFOCUSING IMAGES CAPTURED BY A PLENOPTIC CAMERA AND AUDIO BASED REFOCUSING IMAGE SYSTEM

(71) Applicant: INTERDIGITAL CE PATENT HOLDINGS, Paris (FR)

(72) Inventors: Valérie Allie, Cesson Sevigne (FR); Pierre Hellier, Cesson Sevigne (FR); Quang Khanh Ngoc Duong, Cesson Sevigne (FR); Patrick Perez, Cesson Sevigne (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 15/764,032

(22) PCT Filed: Sep. 28, 2016

(86) PCT No.: PCT/EP2016/073107
§ 371 (c)(1),
(2) Date: Mar. 28, 2018

(87) PCT Pub. No.: WO2017/055348
PCT Pub. Date: Apr. 6, 2017

(65) Prior Publication Data
US 2018/0288307 A1 Oct. 4, 2018

(30) Foreign Application Priority Data
Sep. 29, 2015 (EP) .................................... 15306528

(51) Int. Cl.
*H04N 5/232* (2006.01)
*H04N 5/225* (2006.01)
(Continued)

(52) U.S. Cl.
CPC .......... *H04N 5/23212* (2013.01); *G06F 3/16* (2013.01); *H04N 5/23296* (2013.01);
(Continued)

(58) Field of Classification Search
CPC .......... H04N 5/32312; H04N 5/32396; H04N 13/383; H04N 7/147; H04N 5/23212;
(Continued)

(56) References Cited

U.S. PATENT DOCUMENTS 7,483,061 B2 * 1/2009 Fredlund ................... H04N 5/76
348/231.4
8,803,988 B2 8/2014 Lee et al.
(Continued)

FOREIGN PATENT DOCUMENTS

| CN | 101278596 | 10/2008 |
|----|-----------|---------|
| CN | 104281397 A | 1/2015 |

(Continued)

OTHER PUBLICATIONS

Hegedus, M. et al., "Sensor Fusion Method for Passive Acoustic Arrays," 2009, IEEE Pacific Rim Conference on Communications, Computers and Signal Processing.
(Continued)

*Primary Examiner* — Marly S Camargo
(74) *Attorney, Agent, or Firm* — Lily Neff (57) ABSTRACT

A method and system is provided for refocusing images captured by a plenoptic camera. In one embodiment the plenoptic camera is in processing with an audio capture device. The method comprises the steps of determining direction of a dominant audio source associated with an image; creating an audio zoom by filtering out all other audio signals except those associated with said dominant audio source; and performing automatic refocusing of said image based on said created audio zoom.

13 Claims, 10 Drawing Sheets

(51) Int. Cl.
- *H04N 7/14* (2006.01)
- *H04N 13/383* (2018.01)
- *G06T 7/557* (2017.01)
- *G06T 7/174* (2017.01)
- *H04R 3/00* (2006.01)
- *H04R 1/40* (2006.01)
- *H04R 1/02* (2006.01)
- *G06F 3/16* (2006.01)
- *G06T 13/20* (2011.01)

(52) U.S. Cl.
CPC ............ *H04N 7/147* (2013.01); *H04N 13/383* (2018.05); *H04R 1/406* (2013.01); *H04R 3/005* (2013.01); *H04R 2430/25* (2013.01); *H04S 2400/15* (2013.01)

(58) Field of Classification Search
CPC .... H04N 5/23296; H04R 1/406; H04R 1/028; G06F 3/16
USPC ............. 348/240.99, 231.4, 423.1, 462, 512, 348/14.08, 14.09; 381/92
See application file for complete search history.

(56) References Cited

U.S. PATENT DOCUMENTS

| | | | | |
|---|---|---|---|---|
| 9,875,410 | B2* | 1/2018 | Oh | H04N 7/183 348/143 |
| 10,674,057 | B2* | 6/2020 | Hellier | H04N 5/232 348/345 |
| 2002/0140804 | A1 | 10/2002 | Colmenarez et al. | |
| 2003/0160862 | A1* | 8/2003 | Charlier | H04N 7/14 348/14.08 |
| 2008/0247567 | A1* | 10/2008 | Kjolerbakken | H04R 3/00 381/92 |
| 2009/0141915 | A1 | 6/2009 | Ko et al. | |
| 2010/0110232 | A1 | 5/2010 | Zhang et al. | |
| 2010/0123785 | A1 | 5/2010 | Chen et al. | |
| 2010/0128145 | A1* | 5/2010 | Pitts | H04N 5/23213 348/345 |
| 2011/0317041 | A1* | 12/2011 | Zurek | H04N 5/262 348/240.99 |
| 2013/0076931 | A1* | 3/2013 | Border | H04N 5/232 348/222.1 |
| 2013/0342526 | A1* | 12/2013 | Ng | G06T 15/00 345/419 |
| 2013/0342730 | A1* | 12/2013 | Lee | H04N 5/772 348/231.4 |
| 2014/0035959 | A1 | 2/2014 | Lapstun | |
| 2014/0104392 | A1 | 4/2014 | Thorn et al. | |
| 2014/0254808 | A1 | 9/2014 | Park et al. | |
| 2015/0029304 | A1* | 1/2015 | Park | H04N 5/23238 348/36 |
| 2015/0078556 | A1 | 3/2015 | Shenoy et al. | |
| 2015/0130907 | A1 | 5/2015 | Kim et al. | |
| 2016/0117077 | A1 | 4/2016 | Xu et al. | |
| 2016/0148057 | A1* | 5/2016 | Oh | G06K 9/00771 345/143 |
| 2017/0287499 | A1* | 10/2017 | Duong | H04R 3/005 381/92 |
| 2018/0249178 | A1* | 8/2018 | Guillotel | H04N 19/105 375/240.12 |
| 2020/0123785 | A1* | 3/2020 | Hog | G06T 7/174 382/173 |

FOREIGN PATENT DOCUMENTS

| | | | |
|---|---|---|---|
| CN | 104704821 A | 6/2015 | |
| CN | 104780341 | * 7/2015 | .............. H04N 7/15 |
| EP | 2690886 | 1/2014 | |
| JP | 2005354223 A | 12/2005 | |
| JP | 2011211291 A | 10/2011 | |
| WO | WO2014080074 | 5/2014 | |
| WO | WO 2014094874 A1 | 6/2014 | |

OTHER PUBLICATIONS

Chakraborty, R. et al., "Sound-Model_Based Acoustic Source Localization Using Distributed Mircrophone Arrays", 2014, IEEE International Conference on Acoustics, Speech and Signal Processing.
Nakadai, K. et al., "Footstep Detection and Classification Using Distributed Microphones," 2013, 14th International Workshop on Image Analysis for Multimedia Interactive Services.
ISR for EP15306528.9 dated Apr. 7, 2016.
ISR for PCTEP2016073107 dated Dec. 5, 2016.
Bitzer et al, "Superdirectional microphone array," in Microphone Arrays, Springer Verlag, 2010, ch.2, pp. 19-38.
Blandin et al., "Multi-source TDOA estimation in reverberant audio using angular spectra and clustering," Signal Processing, Elsevier, 2012, 92, pp. 1950-1960.
Pavlidi et al. "Real-Time Multiple Sound Source Localization and Counting using a Circular Microphone Array," IEEE Transactions on Audio, Speech, and Language Processing, vol. 21, No. 10, 2013.
Ng, R., et al., "Light field photography with a hand-held plenoptic camera", 2005 Computer Science Technical Report CSTR, 2(11).
Gu, et al., "Robust Adaptive Beamforming Based on Interference Covariance Matrix Reconstruction and Steering Vector Estimation", IEEE Transactions on Signal Processing, vol. 60, No. 7, Jul. 2012.

* cited by examiner

METHOD OF REFOCUSING IMAGES CAPTURED BY A PLENOPTIC CAMERA AND AUDIO BASED REFOCUSING IMAGE SYSTEM

This application claims the benefit, under 35 U.S.C. § 365 of International Application PCT/EP2016/073107, filed 28 Sep. 2016, which was published in accordance with PCT Article 21(2) on 6 Apr. 2017 in English and which claims the benefit of European Patent Application No. 15306528.9, filed 29 Sep. 2015.

TECHNICAL FIELD

The present disclosure relates generally to digital recording and photography and more particularly to digital recording and photography via a plenoptic camera using audio based selection of focal plane and depth.

BACKGROUND

Photography creates durable images by recording light or other electromagnetic radiation. Images are captured electronically by means of an image sensor or chemically by means of a light-sensitive material. Typically, a lens is used to focus the light reflected or emitted from objects into a real image on the light-sensitive surface, inside a camera during a timed exposure. With an electronic image sensor, an electrical charge is produced at each pixel, which is then processed and stored in a digital image file for further use. In classic photography, the focal surface is approximately a plane or focal plane. The focal surface is perpendicular to the optical axis of the camera and the depth of field is constant along the plane. The images that are captured are basic in configuration since they are limited in range due to these rules relating to focal surface of depth of field. By contrast, light field or plenoptic cameras offer more complex configurations.

A plenoptic camera uses a micro-lens array that is positioned in the image plane of a main lens and before an array of photosensors onto which one micro-image (also called sub-image) is projected. Consequently, each micro-image depicts an area of the captured scene and each pixel associated with that micro-image shows this certain area from the point of view of a certain sub-aperture location on the main lens exit pupil. The raw image of the scene is then obtained as a result of the sum of all the micro-images acquired from respective portions of the photo-sensors array. This raw image contains the angular information of the light-field. Theoretically and computationally, the plenoptic cameras offer the possibility to project superior image captures using complex configurations which are not available when using classic cameras. Unfortunately, however, there are many practical shortcomings that have limited the prior art from taking advantage of the possibilities that can be realized using plenoptic cameras. These limitations have been even more challenging when attempting capturing of video contents.

SUMMARY

A method and system is provided for refocusing images captured by a plenoptic camera. In one embodiment the plenoptic camera is in processing with an audio capture device. The method comprises the steps of determining direction of a dominant audio source associated with an image; creating an audio zoom by filtering out all other audio signals except those associated with said dominant audio source; and performing automatic refocusing of said image based on said created audio zoom.

In a different embodiment, an audio based refocusing image system is provided that comprises a plenoptic video camera for capturing video images, audio capturing means for capturing audio associated with the captured images, means for determining a dominant audio source, means for performing an audio signal analysis to determine direction of the dominant audio source, means for identifying an audio scene of interest based on direction of dominant audio source, means for creating an audio zoom by conducting beamforming on audio scene of interest to selectively filter out all other audio signals except those associated with the dominant audio source; and means for providing automatic refocusing of the image based on the created audio zoom.

Additional features and advantages are realized through the techniques of the present invention. Other embodiments and aspects of the invention are described in detail herein and are considered as part of the claimed invention. For a better understanding of the invention with advantages and features, refer to the description and to the drawings.

BRIEF DESCRIPTION OF THE DRAWINGS

The invention will be better understood and illustrated by means of the following embodiment and execution examples, in no way limitative, with reference to the appended figures on which.

In FIGS. 1-10, the represented blocks are purely functional entities, which do not necessarily correspond to physically separate entities. Namely, they could be developed in the form of software, hardware, or be implemented in one or several integrated circuits, comprising one or more processors.

Wherever possible, the same reference numerals will be used throughout the figures to refer to the same or like parts.

DESCRIPTION

It is to be understood that the figures and descriptions of the present invention have been simplified to illustrate elements that are relevant for a clear understanding of the present invention, while eliminating, for purposes of clarity, many other elements found in typical digital multimedia content delivery methods and systems. However, because such elements are well known in the art, a detailed discussion of such elements is not provided herein. The disclosure herein is directed to all such variations and modifications.

Figure 1:
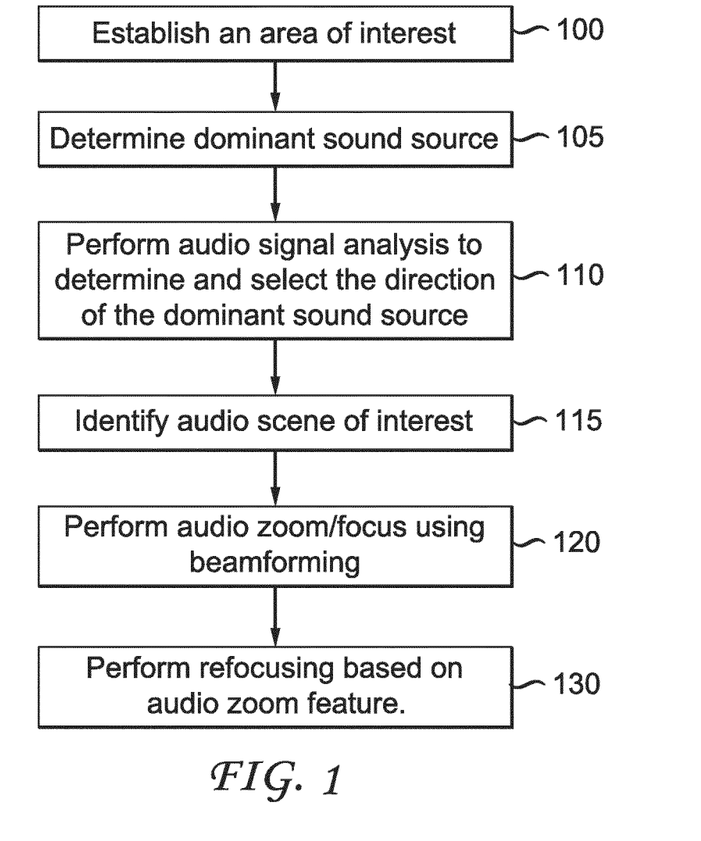
FIG. 1 depicts a flow diagram illustrating steps for conducting automatic refocusing function according to one embodiment.

FIG. 1 is a flow chart depiction of one embodiment illustrating a methodology providing automatic refocusing of images using one or more plenoptic camera(s). In one embodiment, an audio component can be used to calculate the appropriate focal plane and depth of field of an image. One such technique is discussed using the methodology of FIG. 1. The steps of embodiment of FIG. 1, will be discussed in conjunction with system configuration of embodiments provided in FIGS. 2 through 10, to aid understanding.

In classic photography, the focal surface is a plane perpendicular to the optical axis of the camera. In using plenoptic cameras, similar re-focus properties can be exploited when taking still pictures, as the user interaction remains at a basic level. This is not the case with video captures and live image streaming(s) using a plenoptic camera, as more sophisticated computations are needed. Since scenes and images captured by array of lenses in a plenoptic camera are captured from different angles, and there are different options for choosing the extent of sharpness of different images in a scene, focusing properties of different scenes and images can be challenging. It would be desirable to use an automatic refocusing techniques but it challenging to do so in where the focal planes remain perpendicular to the optical axis. This is because in many instances the focal planes cannot remain perpendicular to the optical axis, especially during an ever changing video or live stream broadcast. Other examples can also be easily imagined. For example, consider a case where an "all-in-focus" mode is utilized. In this case, the captured scene produces images that must all remain intentionally sharp, irrespective of distance. This can amount to infinite depths of fields and arbitrary focus planes that are not perpendicular to the optical axis. In a different example, an "interactive focus" field can be used that allows a user to point and select an object of interest. In this case, the plane of focus must be computationally placed at the right distance for each image. In this case, the focal point is perpendicular to the optical axis only for objects that must be kept in sharp focus. In a similar case, only objects in close proximity may be selected to produce sharp images. In such a case, the depth of fields are kept as a small number constant, and all scene elements at a distance are differently computed than the closer ones. Consequently, as objects get out of focus they appear intentionally blurred. Yet in another case, the camera is disposed such that the focus plane is slanted and therefore the focal planes are not perpendicular to the optical axis.

Figure 2A:
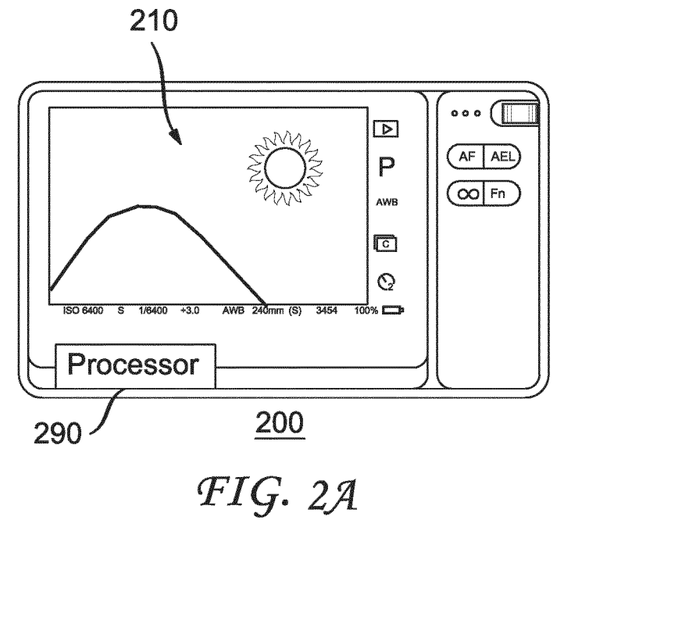
FIGS. 2A and 2B depict a block diagram of a system used in conducting processing steps according to the embodiment of FIG. 1.
Figure 2B:
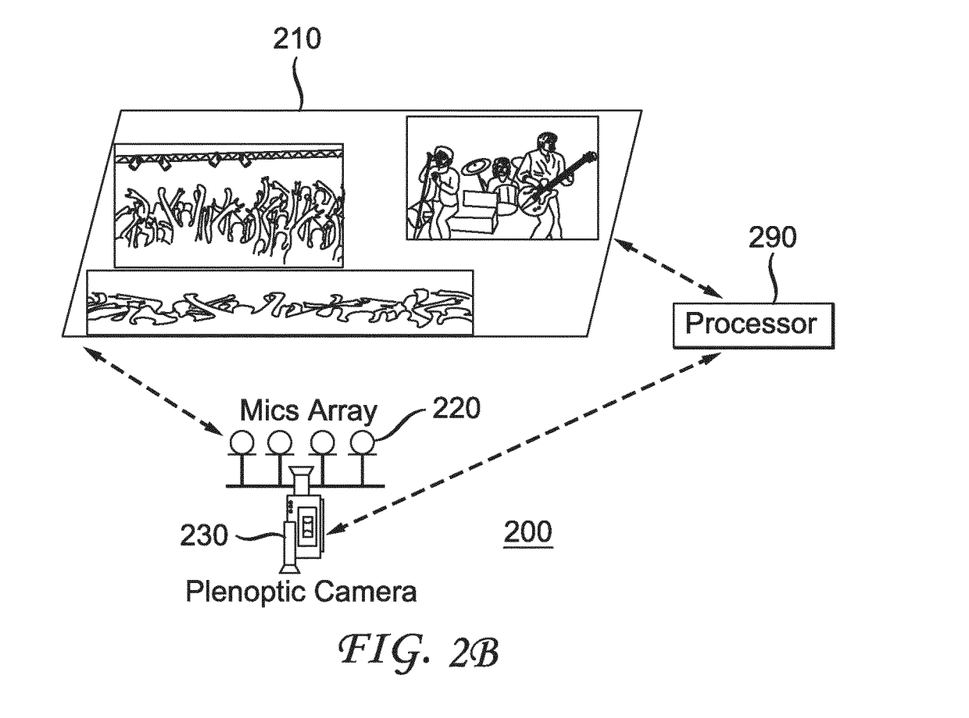

Referring back to the embodiment of FIG. 1, the technique used herein can be applied, in one embodiment, such that an image (hereinafter defined as a still image or a video capture) can be projected optimally. The image/video can be provided as a broadcast stream, a still picture, a recorded video or selected by a user via a user selection input device as can be appreciated by those skilled in the art. In each case, a light field segmentation is performed accordingly, in each case, to identify the depth of this area or object depth. Focus plane is then defined, perpendicular to the optical axis, so that area or object of interest remains in sharp focus as intended. This technique can be extended to video captures (with or without object tracking) to ensure time consistency between frames. Before discussing the individual steps as shown in embodiment of FIG. 1, it may be helpful to consider a system that can be used in employing such steps. FIGS. 2A and 2B, depict block diagrams of a system as per one embodiment of the present principles.

The system of FIGS. 2A and 2B can be utilized to apply the techniques provided by the embodiment of FIG. 1. In FIGS. 2A and 2B, an automatic refocusing system 200 is shown using one or more plenoptic camera and associated technology. In one embodiment, a display 210 is shown. The display 210 can be of any size or shape as can be used in conjunction with a computer, a television set, a projection screen, a mobile device such as a smart phone and others as can be appreciated by those skilled in the art. In the examples provided in the figures, to aid understanding, a large display such as a projection screen or television display is used but this is only in the way of example.

FIG. 2A can incorporate all the components of FIG. 2B, in one embodiment. Alternatively, FIG. 2B can be comprised of different freestanding components as will be discussed. To aid understanding, the embodiment of FIG. 2B will be now discussed as the separate components are visibly identifiable and therefore easier for reference purposes.

FIG. 2B depicts a system 200 with a display 210. In one embodiment, the system 200 comprises a light-field video capture device 230 based on plenoptic or camera array technology (herein also referenced simply as plenoptic camera 230). An audio capture device 220 is in processing communication with the camera 230. The audio capture device 220 is comprised of one or several distributed microphone arrays. In one embodiment, the audio system 220 (i.e. the microphones) is approximately calibrated with respect to video capture device or plenoptic camera 230. In the example depicted in FIGS. 2A and 2B, one or a plurality of processors referenced by numeral 290 is/are provided. The processor 290 is in processing communication with the display 210, the plenoptic camera 230 and the audio capture device 220 as indicated by the dotted lines. In case there is more than one processor, the multiple processors are also in processing communication with one another. The processor(s) may be embedded in different areas within the display 210, the camera 230, the audio capture device 220 or be alternatively freestanding as shown in the example of FIGS. 2A and 2B. Therefore, in one embodiment where one or more processors are embedded in each the camera 230 and/or the audio capture device 220, the camera 230 and audio capture device 220 can be sending and receiving digital data to one another and be in processing communication with one another. In addition, the processor(s) can be in communication with other computers or computing environments and networks (not shown).

Now referring back to FIG. 1, in the step shown by reference 100, a dominant audio source is determined that is associated with a displaying image. In one embodiment, the dominant audio source can be determined on a continual basis when images quickly appear in form of image or video in rapid succession of one another during a live or recorded program and/or broadcast. In one embodiment, an audio processing technique can be used to allow the extraction of dominant audio directions, such as by audio source localization algorithms as can be appreciated by those skilled in the art. The direction of the dominant audio source is then selected as the direction of interest of the audio is determined as shown by reference numerals 110. In another embodiment, steps 105 and 110 may be combined in one step such that the audio source localization algorithm outputs the direction of dominant audio source which will be then considered as the target source to be refocused.

Figure 3:
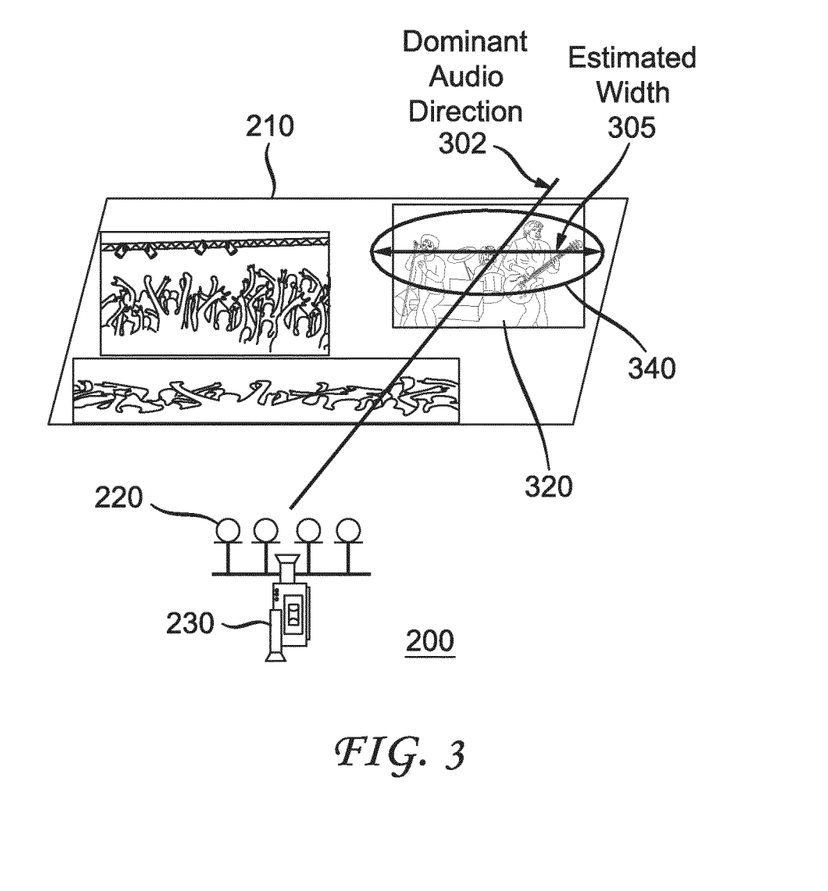
FIG. 3 depicts a block diagram illustrating the dominant audio direction and estimated width of an area of interest according to one embodiment.

Applying steps 105 to 110 of FIG. 1 to the examples discussed by embodiments of FIGS. 2A and 2B can result in a system as depicted in FIG. 3.

FIG. 3 illustrates an embodiment where the audio processing technique is used to extract audio directions associated with the dominant audio source (i.e. FIG. 1 in steps 110). In the embodiment of FIG. 3, a region of interest 340 is established that is associated with at least one dominant audio direction. The dominant audio direction is determined as shown by reference numerals 302 and the width of the region of interest 340 is also calculated as shown at 305. In one example, the width of the region of interest will be narrow for a dominant point source may be such that the dominant audio is coming from a single direction (single person speaking). In another example, the width will be set larger for a more spread out or a moving source. This may be the case where the dominant audio is coming from several co-located sources, such as from a music band with several musical instruments and leading voices on a stage as shown in the screen provided in the top left corner of FIG. 3 as shown by reference numerals 320.

Figure 4:
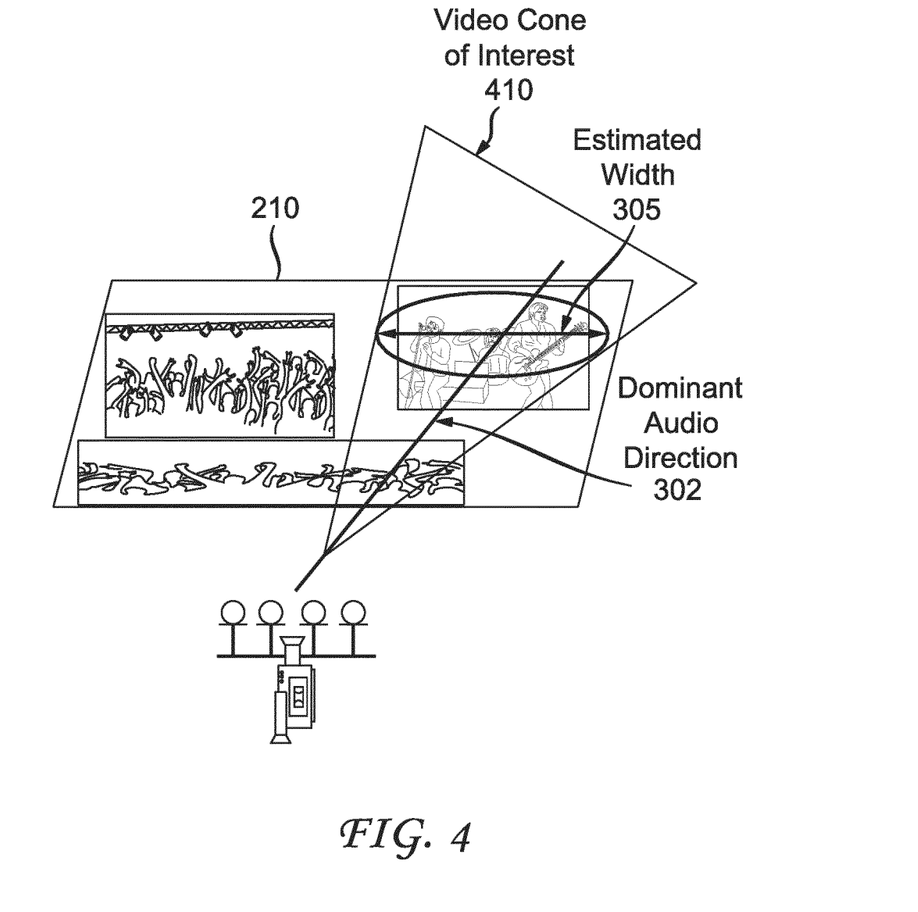
FIG. 4 depicts a graphical illustration of a video cone of interest according to one embodiment.

In one example, where an audio source localization algorithm is used to further establish audio directions, an audio signal analysis is also performed to provide an approximate estimate of the angular width of the area of interest. The audio source localization technique is then used as to define the angular extent of a region of interest, resulting in a "cone of interest" as shown in FIG. 4 at 410.

Figure 5:
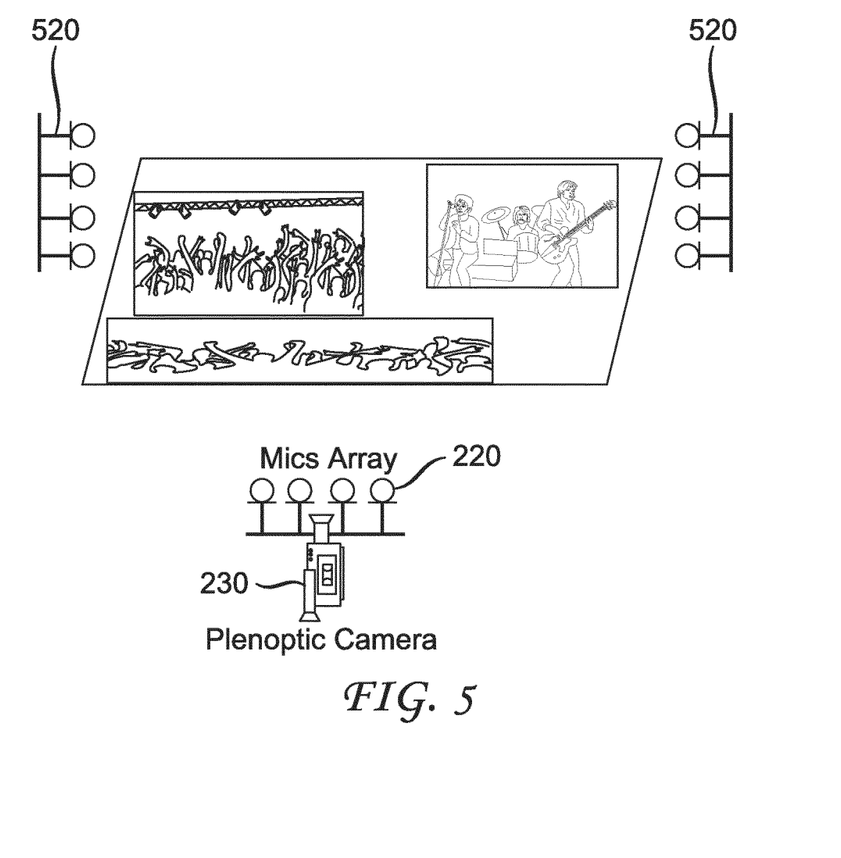
FIGS. 5 and 6 provide different embodiments of a system having a distributed microphone array configuration.
Figure 6:
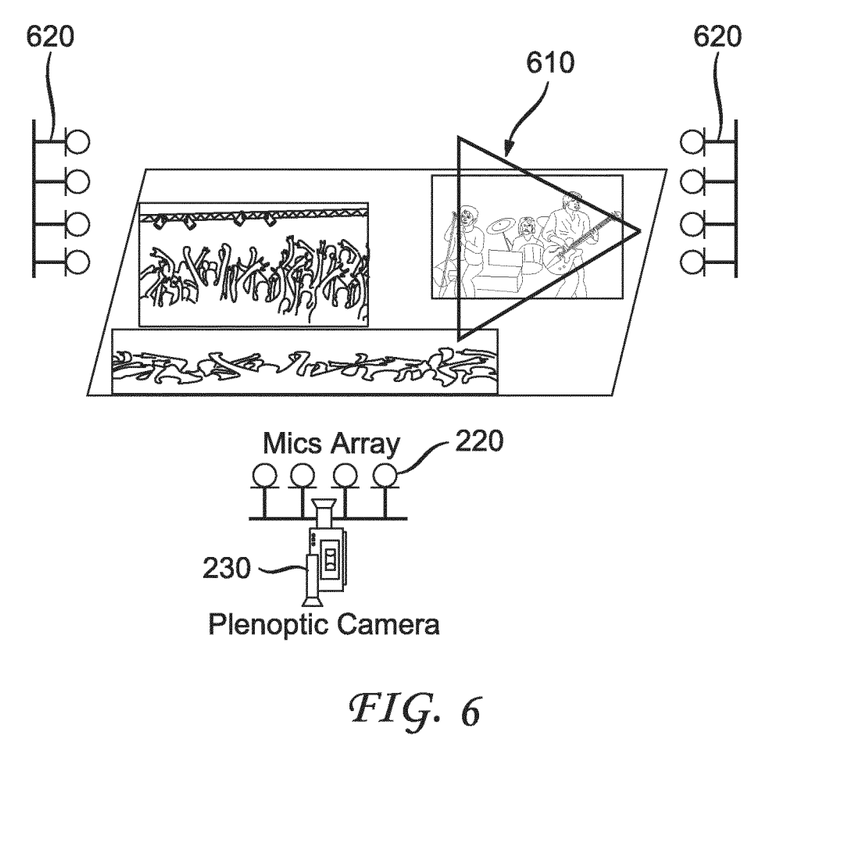

In one embodiment, as shown in FIG. 5, the immersive user experience can be further enhanced by using state-of-the-art distributed microphone arrays 520. In the embodiment of FIG. 6, a similar distributed microphones array system 620 can be used in order to improve automatic audio localization. In FIG. 6, the dominant audio source, such as discussed in step 110 of FIG. 1, is determined by exploiting both audio and video signals in order to define directions of interest. Similar to FIG. 4, video cone of interest 610 is determined which in this case is enhanced due to the microphone array 620. For determining the audio signal, the localization algorithm is used and the direction of dominant audio source is considered as the direction of interest. For determining the video signal, an object tracking algorithm can be used in one embodiment. In this case, the directions of moving objects in the scene can be potentially considered as a direction of interest associated with the dominant audio source. In one embodiment, the audio and video can also be combined to provide a late fusion of candidates as detected in the audio and video case alone so that they can be applied accordingly in finding an optimized direction of interest.

Referring back to FIG. 1, the next step referenced by numerals 115 will be performed. In step 115, an audio scene of interest is determined and an audio focus analysis is performed at step 120 on this audio scene. To perform an audio focus or an audio zoom, audio beams are created inside an audio scene following the determination of audio directions of interest. In one embodiment, as may be appreciated by those skilled in the art audio beams are created using beamforming. Beamforming or spatial filtering is a signal processing technique that uses directional signal transmission or reception in order to achieve spatial selectivity. This is achieved by combining elements in a phased array in such a way that some signals at particular angles experience constructive interference while others experience destructive interference. To change the directionality of the array, the phase and relative amplitude of the signal is controlled so as to create patterns of constructive and/or destructive wave interferences. Adaptive beamforming is used to detect and estimate the signal-of-interest at the output of a sensor array by means of optimal spatial filtering and interference rejection. In this way audio signals from the microphone array of only a certain signal pattern can be selected for the target source. Audio focus can form simultaneous multiple beam, and can track an active speaker. The concept of beamforming as provided by step 120 is further illustrated by the block diagram depiction of FIG. 7.

Figure 7:
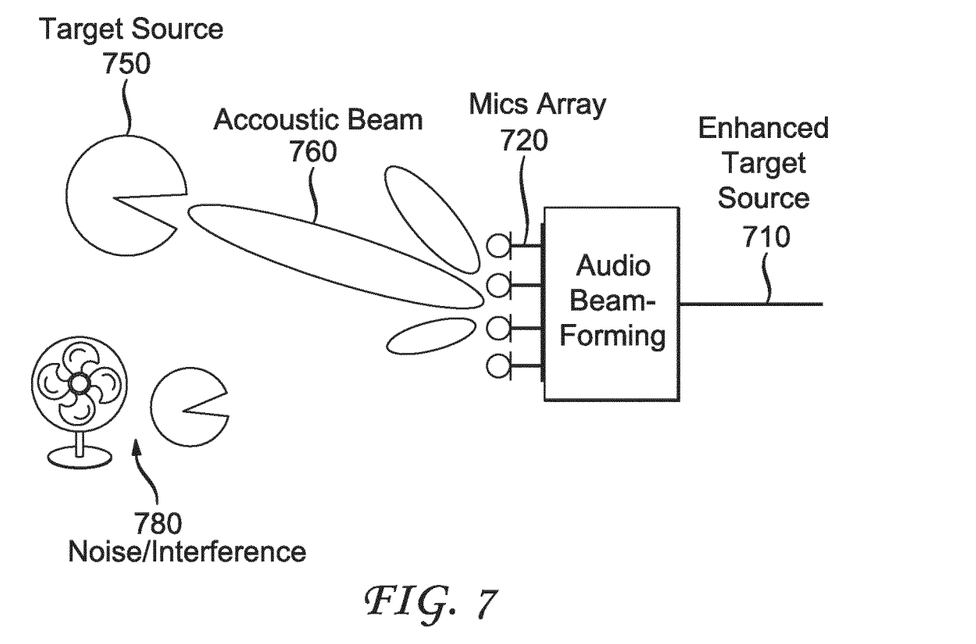
FIG. 7 depicts a block diagram illustration of beamforming step of embodiment of FIG. 1.

In one embodiment, as shown in FIG. 7, the width of the audio beam is dependent of the microphone array size and setting. A target source that generates sound is provided in the exemplary depiction of FIG. 7 as shown at 710. The target source 750 generates an acoustic beam shown at 760. The sound is then received by the microphone array 720 and processed using the audio beam forming technique to provide an enhanced target source both in terms of video and audio. Noise and other interferences (780) are appropriately filtered out. The resulting audio beam 760 is also shown in the graphic depiction of FIG. 8 in an embodiment that resembles those depicted in FIGS. 2 through 4, and in the graphic depiction used by reference numerals 960 of FIG. 9, in an embodiment with a distributed microphone array configuration (similar to FIGS. 5 and 6).

Figure 10:
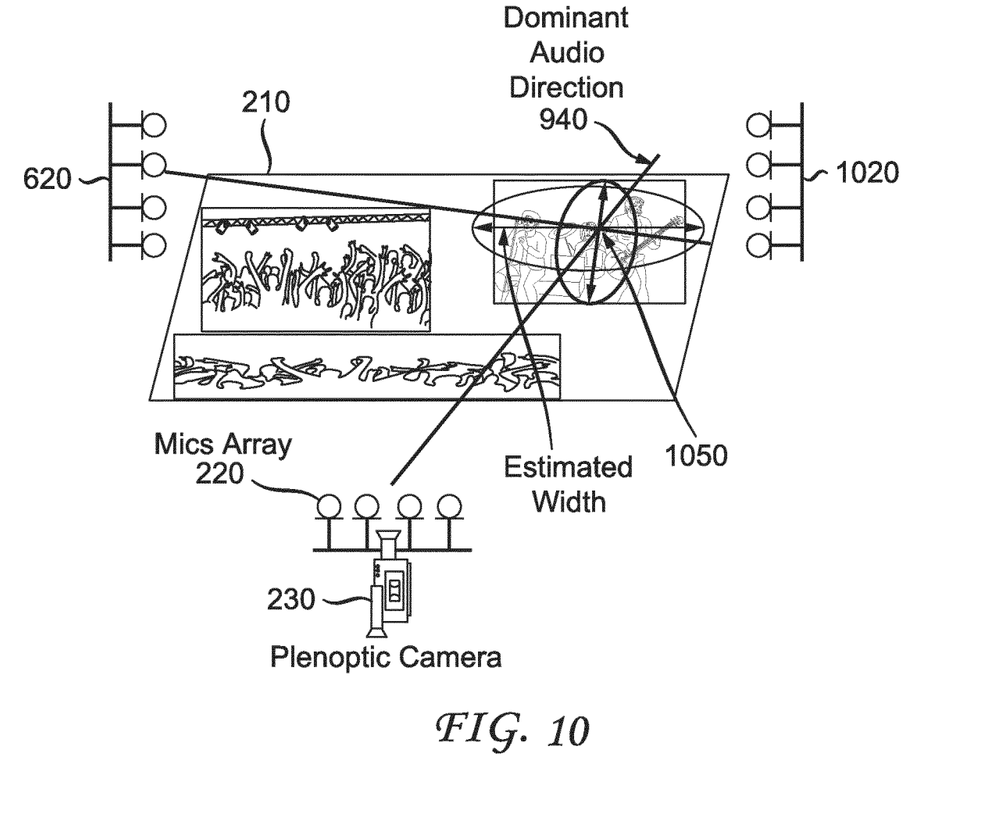
FIG. 10 depicts a block diagram of a system having a distributed microphone array according to another embodiment.

In FIG. 10, another embodiment is used wherein the audio system comprises a distributed microphone array system 1020. A dominant audio direction 940 is determined. Subsequently, as shown by reference numerals 1050, by computing intersections between regions of interest, further information can be obtained on interest depth so that other steps such as beamforming as in step 120 of FIG. 1.

In an alternate embodiment (not shown), a user interaction system can be provided where the user selects (i) a direction among the audio based identified candidate directions and (ii) a width. Based on this selection, in one embodiment, an audio beamforming technique can be used such as the one discussed to focus on sounds coming from a particular chosen direction. The final focal surface and depth-of-field are then selected and rendered, as before according to direction and width information.

Figure 8:
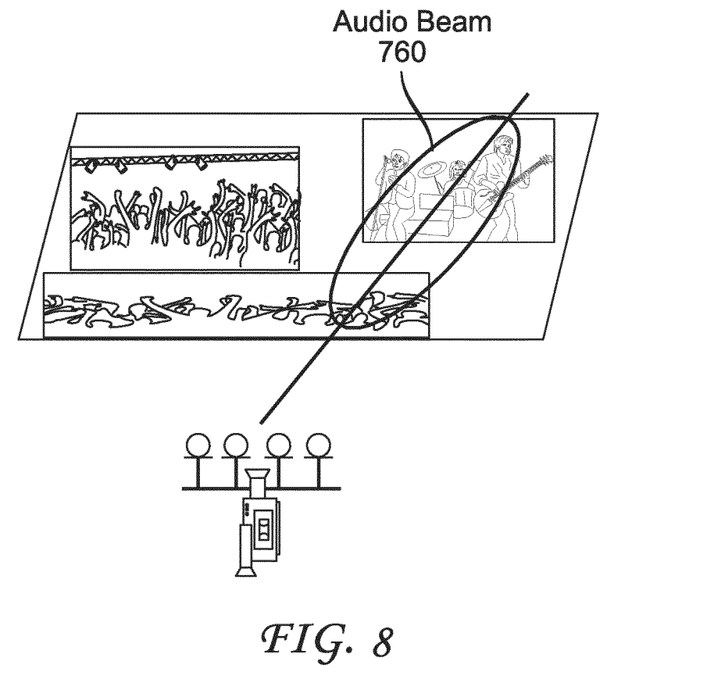
FIG. 8 depicts beamforming function such as that conducted in accordance to a system such as used in conjunction with FIGS. 2 through 4.
Figure 9:
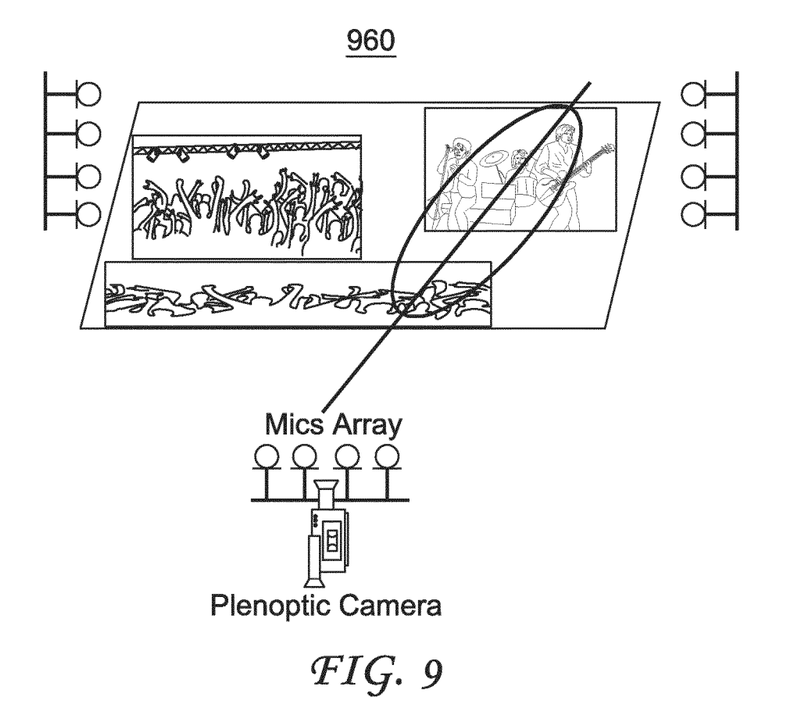
FIG. 9 depicts beamforming function such as that conducted in accordance to a system used in conjunction with FIGS. 5 and 6.

In the embodiments of FIGS. 8 through 10, a beamforming output signal x(t). The output signal contains both sounds from positions A and B, while the targeted zooming plane may only include sounds from position B. In this example, audio signal from microphone near position B would be exploited so that the final audio output would be, in one embodiment presented as:

$$xx(t)=\text{alpha}*x(t)+(1-\text{alpha})*y(t),$$

where alpha is the weighting factor. In this example, the higher value of alpha will mean that audio signal recorded from local microphone position B contributes more to the final audio focus as shown.

Now referring back again to FIG. 1, the final step 130 is performed. Step 130 is a video refocusing step that is driven by an audio source of interest. The scene elements in the cone of interest are rendered in focus and the rest of the focal surface (and field-of-depth) is then automatically deduced in a meaningful way. This enables access to new, audio-based, engaging ways of selecting automatically and dynamically the focal surface and the depth-of-field. In this way the audio zoom feature can also be enriched with a strongly correlated video focus.

The invention claimed is:
1. A method, comprising
refocusing images captured by a plenoptic camera in processing communication with an audio capture device by determining direction of an audio source associated with an image in a scene of interest;

creating an audio zoom based on said audio source by performing beamforming to establish an audio source of interest in said scene of interest and selectively filter out all other audio signals except those associated with said audio source of interest; and rendering a refocused image and associated audio of said image, wherein said rendering rendering is based on said audio source of interest and its correlated image as determined by said created audio zoom.

2. The method of claim 1, wherein said audio capture device further comprises a microphone array.

3. The method of claim 2, wherein said plenoptic camera is a video camera and said captured image is a video image.

4. The method of claim 3, wherein said audio capture device further comprises a plurality of microphone arrays distributed in a plurality of locations.

5. The method of claim 1, further comprising performing an audio signal analysis wherein said audio signal analysis comprises determining an angle and width of said audio scene of interest.

6. The method of claim 1, further comprising determining audio source directions by using audio source localization.

7. The method of claim 1, further comprising user input, wherein a user selects a particular direction in an audio based identified candidate direction.

8. The method of claim 1, further comprising user input, wherein a user selects a particular width in an audio based identified candidate direction.

9. An audio based refocusing image system, comprising:
a processor configured for refocusing images captured by a plenoptic video camera in processing communication with an audio capture device by determining direction of an audio source associated with an image in a scene of interest;

said processor also refocusing images captured by a plenoptic camera in processing communication with an audio capture device by determining direction of an audio source associated with an image;

said processor creating an audio zoom based on said audio source by performing beamforming to selectively filter out all other audio signals except those associated with said audio source of interest; and said processor rendering a refocused image and associated audio of said image, wherein said rendering rendering is based on said audio source of interest and its correlated image as determined by said refocused audio zoom.

10. The audio based automatic refocusing image system of claim 9 further comprising display means for displaying images captured by said plenoptic camera and means for said audio zoom to conduct beamforming on audio scene of interest to selectively filter out all other audio signals except those associated with said dominant audio source.

11. The audio based automatic refocusing image system of claim 9 further comprising a processor in communication with said plenoptic camera, said display and said audio capture device.

12. The audio based automatic refocusing image system of claim 11, wherein said processor is also configured to identify an audio scene of interest based on direction of audio source.

13. The audio based automatic refocusing image system of claim 9, wherein said plenoptic camera is a video camera and said captured image is a video image.

* * * * *

UNITED STATES PATENT AND TRADEMARK OFFICE
CERTIFICATE OF CORRECTION

PATENT NO. : 10,880,466 B2
APPLICATION NO. : 15/764032
DATED : December 29, 2020
INVENTOR(S) : Valérie Allie et al.

It is certified that error appears in the above-identified patent and that said Letters Patent is hereby corrected as shown below:

In the Claims

1. At Column 7, Line 9, Claim 1, replace "rendering rendering" with --rendering--

2. At Column 8, Line 13, Claim 9, replace "rendering rendering" with --rendering--

Signed and Sealed this
Twenty-sixth Day of November, 2024

Katherine Kelly Vidal
*Director of the United States Patent and Trademark Office*